United States Patent
Reason et al.

(10) Patent No.: US 6,301,911 B1
(45) Date of Patent: Oct. 16, 2001

(54) COMPRESSOR OPERATING ENVELOPE MANAGEMENT

(75) Inventors: John Robert Reason, Liverpool; Joao Eduardo Navarro de Andrade, Cicero, both of NY (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 09/277,473

(22) Filed: Mar. 26, 1999

(51) Int. Cl.7 .............................. F25B 41/00; F25B 1/00
(52) U.S. Cl. ..................... 62/196.2; 62/217; 62/228.3
(58) Field of Search ................... 62/217, 228.5, 62/207, 196.2, 228.3

(56) References Cited

U.S. PATENT DOCUMENTS

| | | | |
|---|---|---|---|
| 3,633,380 | * 1/1972 | Pellizzetti | 62/228.3 X |
| 3,698,204 | * 10/1972 | Schotterbeck et al. | 62/217 |
| 4,134,272 | 1/1979 | Reimann | 62/115 |
| 4,184,341 | * 1/1980 | Friedman | 62/228.3 |
| 4,735,055 | 4/1988 | Taylor et al. | 62/115 |
| 4,843,834 | * 7/1989 | Inoue et al. | 62/228.33 X |
| 4,903,495 | 2/1990 | Howland et al. | 62/81 |
| 5,067,556 | 11/1991 | Fudono et al. | 62/196.4 |
| 5,291,745 | 3/1994 | Hanson | 62/89 |
| 5,546,756 | 8/1996 | Ali | 62/204 |
| 5,557,938 | 9/1996 | Hanson et al. | 62/126 |
| 5,598,718 | 2/1997 | Freund et al. | 62/238.6 |
| 5,625,276 | 4/1997 | Scott et al. | 322/24 |
| 5,626,027 | 5/1997 | Dormer et al. | 62/175 |
| 5,628,205 | 5/1997 | Rockenfeller et al. | 62/480 |
| 5,661,378 | 8/1997 | Hapeman | 318/52 |
| 5,715,704 | 2/1998 | Cholkeri et al. | 62/527 |
| 5,771,703 | 6/1998 | Rajendran | 62/204 |
| 5,780,998 | 6/1998 | Scott et al. | 322/46 |
| 5,798,577 | 8/1998 | Lesesky et al. | 307/10.7 |
| 5,829,264 | * 11/1998 | Ishigaki et al. | 62/228.3 |
| 5,867,998 | 2/1999 | Guertin | 62/225 |

\* cited by examiner

*Primary Examiner*—William Wayner
(74) *Attorney, Agent, or Firm*—Niro, Scavone, Haller & Niro

(57) ABSTRACT

An process and method for monitoring and selectively controlling the discharge and suction pressures of a compressor within a transport unit is disclosed. Specifically, the present invention teaches the adjustment of the suction modulation valve, the compressor cylinder banks, and the engine speed solenoid in order to bring the operating compressor discharge and suction pressures within the design operating envelope.

9 Claims, 6 Drawing Sheets

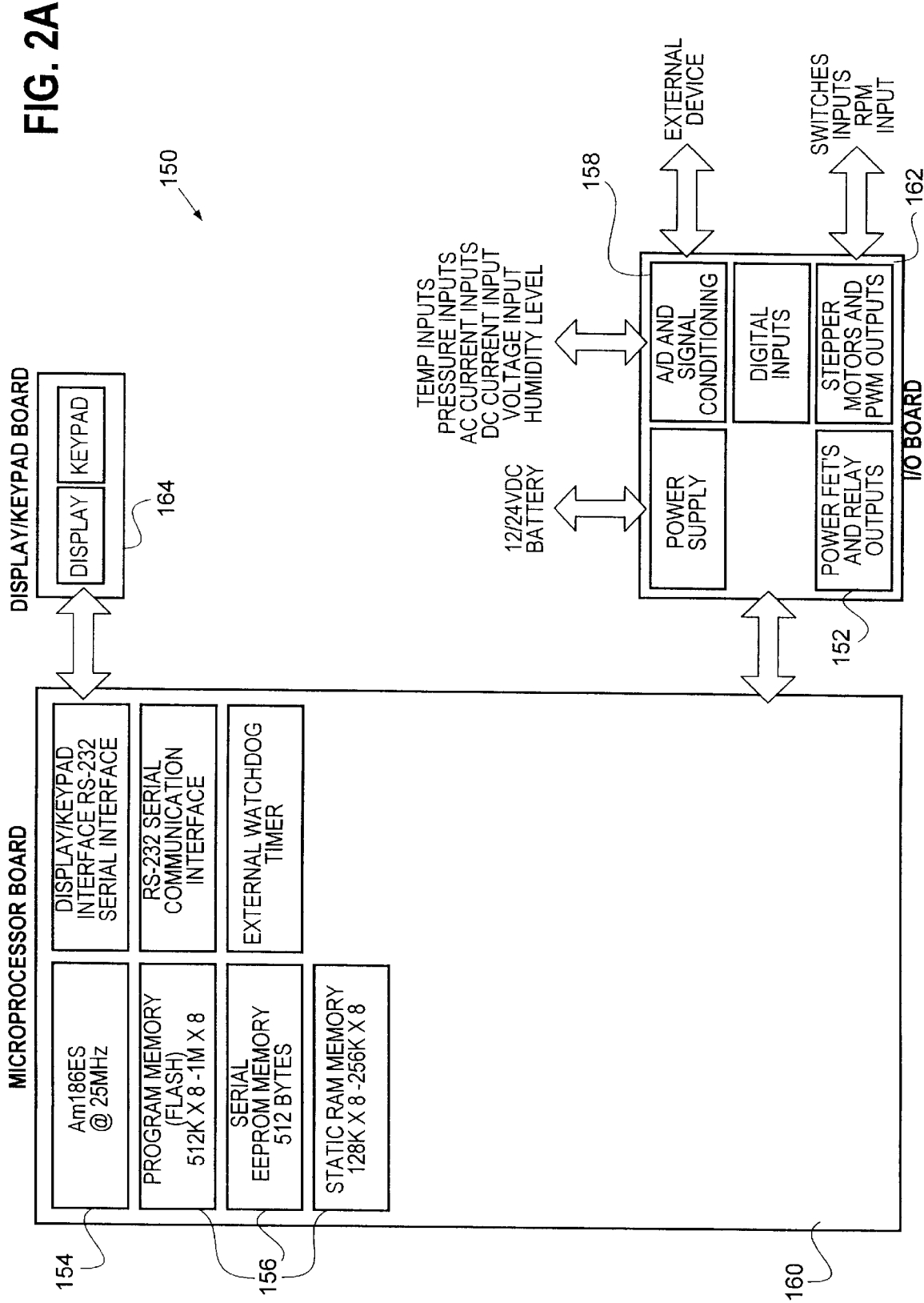

COMPRESSOR OPERATING ENVELOPE MANAGEMENT

I. FIELD OF THE INVENTION

The field of the present invention relates to control systems for transport refrigeration systems. More specifically, the present invention is directed towards implementing a control algorithm for manipulating the suction modulation valve (the "SMV"), the compressor unloaders and the engine speed solenoid to precisely maintain the compressor of the transport refrigeration unit within its design envelope under any normal operating condition.

II. DESCRIPTION OF THE PRIOR ART

A transport refrigeration system used to control enclosed areas, such as the box used on trucks, trailers, containers, or similar intermodal units, functions by absorbing heat from the enclosed area and releasing heat outside of the box into the environment. A number of transport refrigeration units, including units currently sold by assignee, employ a reciprocating compressor to pressurize refrigerant to enable the removal of heat from the box. Reciprocal compressors used in such applications commonly include a suction inlet and a discharge which are connected, respectively, to the evaporator and condenser of the transport refrigeration system. It is axiomatic that in order to ensure the reliability of the reciprocating compressor, the compressor should operate within the limits of the suction and discharge pressures for which it was designed. The ranges and ratios of suction and discharge pressures designed to be handled by a reciprocating compressor at various stages of operation is known as an operating envelope. The failure to operate within the compressor operating envelope will result in unnecessary wear and tear, and ultimately will bring about the premature failure of the compressor, thus creating unacceptable costs of money and time to the operator.

Transport refrigeration systems currently employ a variety of controls to manipulate the operating envelope of a reciprocating compressor. As can be shown by U.S. Pat. Nos. 5,626,027 and 5,577,390, both assigned to the assignee of the present invention, compressors can be operated in a multi-stage mode or in single stage modes depending upon operating temperature. Such dislosure further discuss generally the use of suction modulation for capacity control. However, currently available commercial designs, including those sold by assignee, do not offer the combination of discharge pressure control and suction pressure control to maintain a reciprocating compressor within its designed operating envelope.

The applicants have found that, in order to optimize maintenance of the reciprocating compressor of a transport refrigeration system within its design operating envelope, it is desirable to use a controller within the transport refrigeration system which closes the suction modulation valve (the "SMV") and/or unloads compressor cylinder banks in response to discharge pressures in excess of a preselected limit calculated or compared to a set value by the controller. An unloader, when energized has the effect of removing one or more cylinders from operation within compressor, thus effectively reducing the displaced volume within the compressor. In addition, the applicants have found that maintaining the reciprocating compressor within its design operating envelope is best maintained by selectively unloading compressor cylinder banks in the event that suction pressure is below the minimum suction pressure allowed, as determined the controller.

III. SUMMARY OF THE INVENTION

The control process and system of this invention provides a refrigeration unit for a transport system having a controller for selectively maintaining the reciprocating compressor of the system within its design operating envelope. One of the control parameters for the design operating envelope is the maximum allowable compressor discharge pressure. The maximum allowable compressor discharge pressure is calculated as a function of the suction pressure when the suction pressure is below the transition point. Above the transition point, the maximum discharge pressure is a constant. In situations where the suction pressure is above the transition point, and the discharge pressure is a above the maximum allowable for the operating envelope, the controller of the present invention issues a control signal so as to gradually close the SMV based upon a proportional, integral and derivative (a "PID") control loop to reduce the pressure to within the design operating envelope. If the suction pressure is below the transition point, in addition to the PID control for the SMV, the controller also issues control signals to the compressor cylinder bank unloaders. If the suction pressure is below the transition point and the discharge pressure is above the envelope maximum, the compressor rear cylinder bank is unloaded. If, after a preselected time limit, the discharge pressure is still above the envelope, the front cylinder bank is also unloaded. Once the discharge pressure falls below a predetermined limit within the envelope, the controller issues signals reloading the front and rear cylinder banks.

The controller of the present invention also works to correct conditions wherein the suction pressure is below the minimum allowed for the design operating envelope. If the suction pressure is below the minimum suction pressure allowed for more than a predetermined time limit, the controller issues a control signal to unload the rear cylinder bank. If the suction pressure remains below the minimum allowed by the operating envelope for an additional predetermined time limit, the front cylinder bank is likewise unloaded. If both front and rear banks have been unloaded and the suction pressure is still below the operating minimum for the design operating envelope for a predetermined time limit, then the diesel engine is force into low speed for a preselected period of time. If the suction pressure remains below its design operating envelope minimum after this point, then a proportional-integral (a PI") control is used to gradually open the SMV position. This PI control is disabled if the system current draw is equal to or greater than the maximum allowable current draw for the system. If the suction pressure rises above the minimum required for the design operating envelope plus a hysteresis band value, then the front and rear cylinder banks are loaded.

If suction pressure is greater than the maximum allowable suction pressure, the SMV is gradually closed until the suction pressure drops below the maximum allowable design operating envelope value minus a hysteresis band.

Accordingly, one object of the present invention is to provide a microprocessor control for the regulation of both compressor discharge pressure and suction pressure values.

It is a further object of the invention to provide a microprocessor control for selectively activating and deactivating both the compressor cylinder banks and the suction modulation valve in order to maintain the compressor within its design operating envelope.

It is yet another object of the present invention to provide a controller for using the SMV in combination with the compressor unloaders and engine speed solenoid in order to precisely maintain the compressor within its design envelope under any normal operating conditions.

These and other objects, features, and advantages of the present invention will become more apparent in light of the following detailed description of a best mode embodiment thereof, and as illustrated in the accompanying drawings.

IV. BRIEF DESCRIPTION OF THE DRAWINGS

FIG. 2a shows a block schematic of a second preferred embodiment of a controller of the present invention.

V. DETAILED DESCRIPTION OF THE INVENTION

Figure 1:
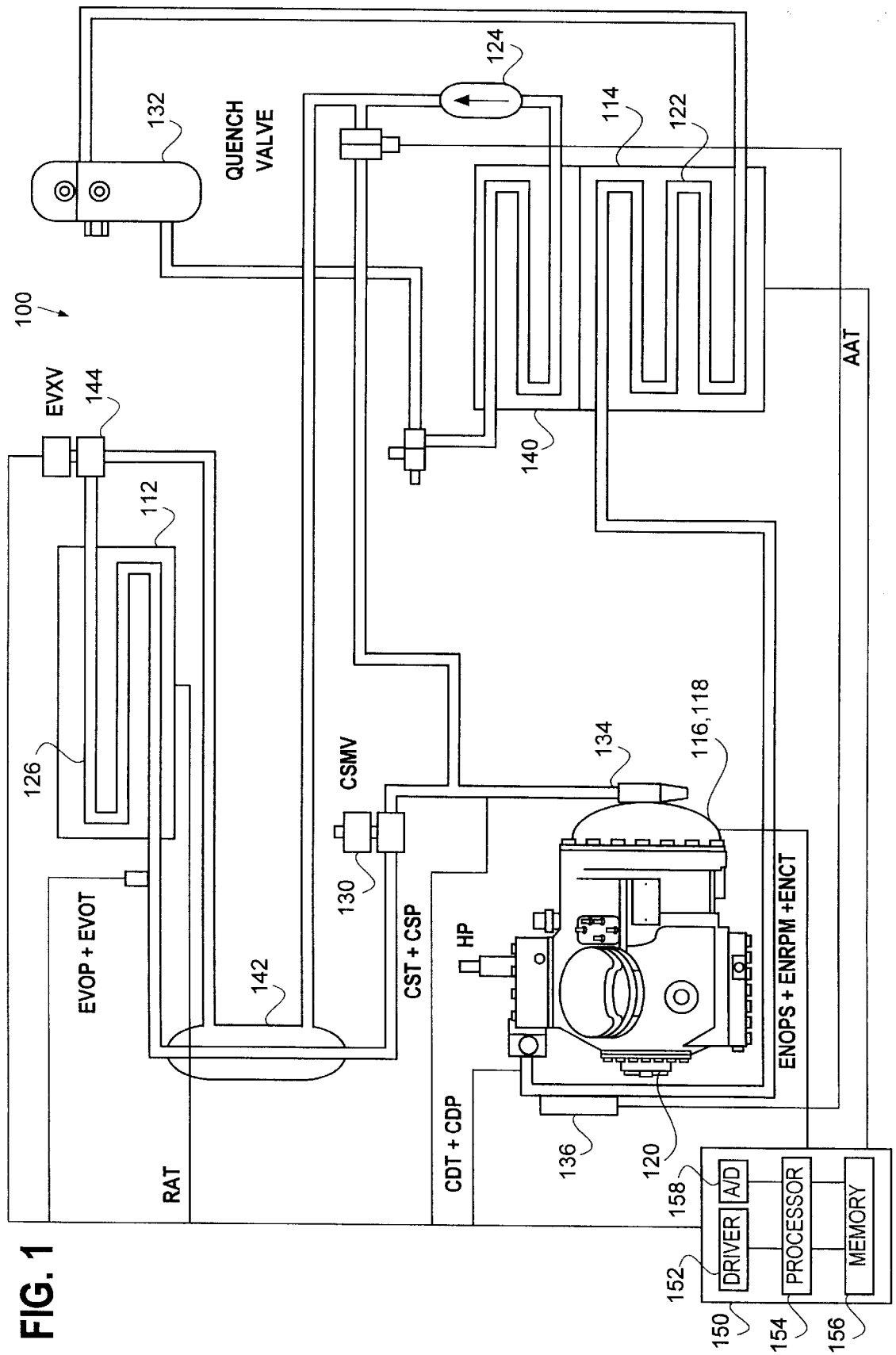
FIG. 1 shows a schematic of the transport refrigeration system of the present invention.

The invention that is the subject of the present application is one of a series of applications dealing with transport refrigeration system design and control, the other copending applications including: "Superheat Control for Optimum Capacity Under Power Limitation and Using a Suction Modulation Valve" (U.S. patent application Ser. No. 09/277, 508); "Economy Mode For Transport Refrigeration Units" (U.S. Pat. No. 6,044,651); "Voltage Control Using Engine Speed" (U.S. patent application Ser. No. 09/277,507); now U.S. Pat. No. 6,726,998 "High Engine Coolant Temperature Control" (U.S. patent application Ser. No. 09/277,472); now U.S. Pat. No. 6,118,627 "Generator Power Management" (U.S. patent application Ser. No. 09/277,509) now U.S Pat. No, 6,196,627; and "Electronic Expansion Valve Control Without Pressure Sensor Reading" (U.S. patent application Ser. No. 09/277,333) now U.S. Pat. No. 6,148,629 all of which are assigned to the assignees of the present invention and which are hereby incorporated herein by reference. These inventions are most preferably designed for use in transportation refrigeration systems of the type described in copending applications entitled: "Transport Refrigeration Unit With Non-Synchronous Generator Power System;" "Electrically Powered Trailer Refrigeration Unit With Integrally Mounted Diesel Driven Permanent Magnet Generator;" and"Transport Refrigeration Unit With Synchronous Generator Power System," each of which were invented by Robert Chopko, Kenneth Barrett, and James Wilson, and each of which were likewise assigned to the assignees of the present invention. The teachings and disclosures of these applications are likewise incorporated herein by reference. FIG. 1 illustrates a schematic representation of the transport refrigeration system 100 of the present invention. The refrigerant (which, in its most preferred embodiment is R404A) is used to cool the box air (i.e., the air within the container or trailer or truck) of the refrigeration transport system 100. is first compressed by a compressor 116, which is driven by a motor 118, which is most preferably an integrated electric drive motor driven by a synchronous generator (not shown) operating at low speed (most preferably 45 Hz) or high speed (most preferably 65 Hz). Another preferred embodiment of the present invention, however, provides for motor 118 to be a diesel engine, most preferably a four cylinder, 2200 cc displacement diesel engine which preferably operates at a high speed (about 1950 RPM) or at low speed (about 1350 RPM). The motor or engine 118 most preferably drives a 6 cylinder compressor 116 having a displacement of 600 cc, the compressor 116 further having two unloaders, each for selectively unloading a pair of cylinders under selective operating conditions.

In the compressor, the (preferably vapor state) refrigerant is compressed to a higher temperature and pressure. The refrigerant then moves to the air-cooled condenser 114, which includes a plurality of condenser coil fins and tubes 122, which receiver air, typically blown by a condenser fan (not shown). By removing latent heat through this step, the refrigerant condenses to a high pressure/high temperature liquid and flow to a receiver 132 that provides storage for excess liquid refrigerant during low temperature operation. From the receiver 132, the refrigerant flows through subcooler unit 140, then to a filter-drier 124 which keeps the refrigerant clean and dry, and then to a heat exchanger 142, which increases the refrigerant subcooling.

Finally, the refrigerant flows to an electronic expansion valve 144 (the "EXV"). As the liquid refrigerant passes through the orifice of the EXV, at least some of it vaporizes. The refrigerant then flows through the tubes or coils 126 of the evaporator 112, which absorbs heat from the return air (i.e., air returning from the box) and in so doing, vaporizes the remaining liquid refrigerant. The return air is preferably drawn or pushed across the tubes or coils 126 by at least one evaporator fan (not shown). The refrigerant vapor is then drawn from the exhanger 112 through a suction modulation valve (or "SMV") back into the compressor.

Figure 2:
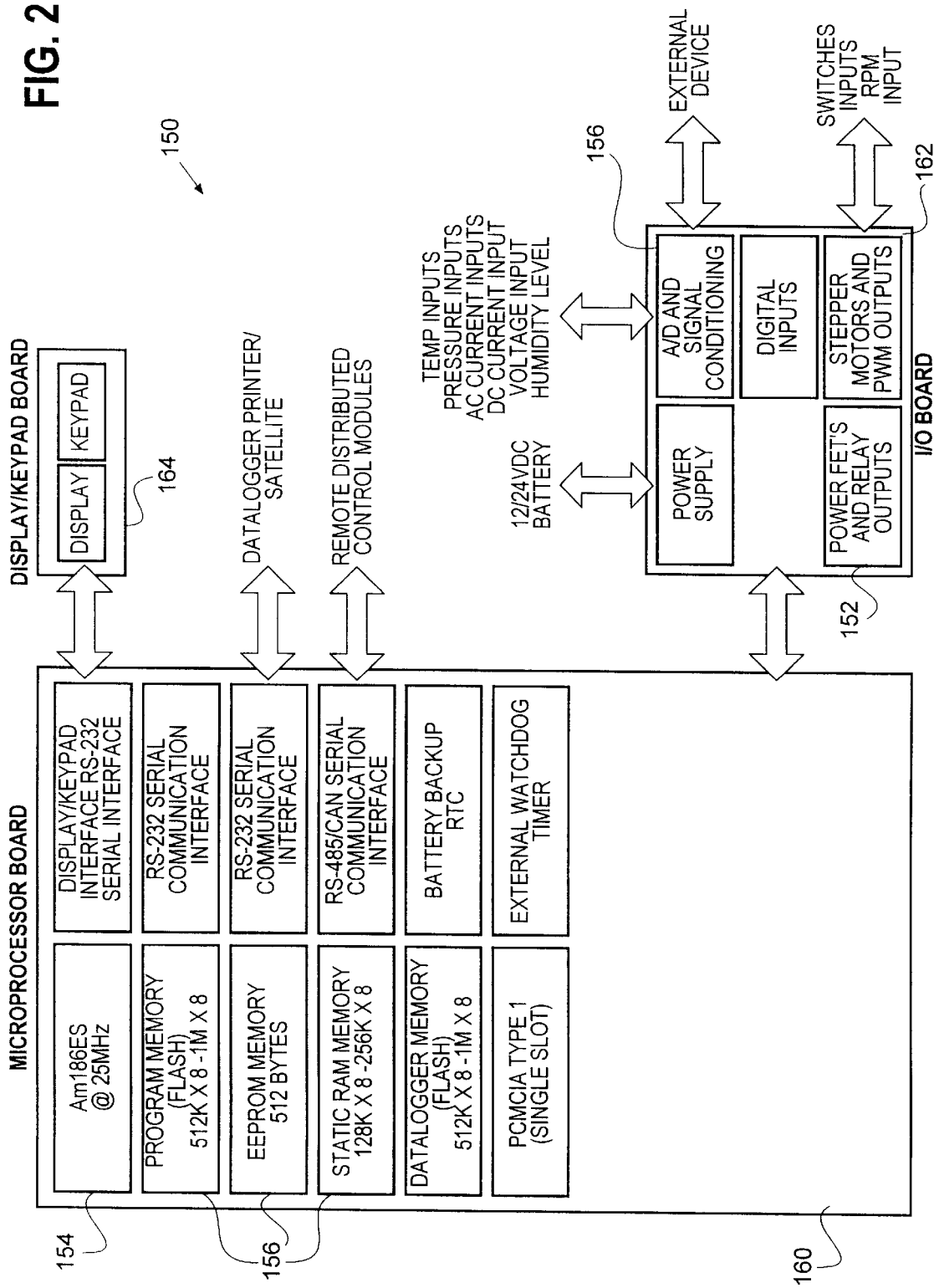
FIG. 2 shows a block schematic of a first preferred embodiment of a controller of the present invention.

Many of the points in the transport refrigeration system are monitored and controlled by a controller 150. As shown in FIGS. 2 and 2A Controller 150 preferably includes a microprocessor 154 and its associated memory 156. The memory 156 of controller 150 can contain operator or owner preselected, desired values for various operating parameters within the system, including, but not limited to temperature set point for various locations within the system 100 or the box, pressure limits, current limits, engine speed limits, and any variety of other desired operating parameters or limits with the system 100. Controller 150 most preferably includes a microprocessor board 160 that contains microprocessor 154 and memory 156, an input/output (I/O) board 162, which contains an analog to digital converter 156 which receives temperature inputs and pressure inputs from various points in the system, AC current inputs, DC current inputs, voltage inputs and humidity level inputs. In addition, I/O board 162 includes drive circuits or field effect transistors ("FEET") and relays which receive signals or current from the controller 150 and in turn control various external or peripheral devices in the system 100, such as SMV 130, EXV 144 and the speed of engine 118 through a solenoid (not shown).

Among the specific sensors and transducers most preferably monitored by controller 150 includes: the return air temperature (RAT) sensor which inputs into the processor 154 a variable resistor value according to the evaporator return air temperature; the ambient air temperature (AAT) which inputs into microprocessor 154 a variable resistor value according to the ambient air temperature read in front of the condenser 114; the compressor suction temperature (CST) sensor; which inputs to the microprocessor a variable resistor value according to the compressor suction temperature; the compressor discharge temperature (CDT) sensor, which inputs to microprocessor 154 a resistor value according to the compressor discharge temperature inside the cylinder head of compressor 116; the evaporator outlet temperature (EVOT) sensor, which inputs to microprocessor 154 a variable resistor value according to the outlet temperature of evaporator 112; the generator temperature (GENT) sensor, which inputs to microprocessor 154 a resistor value according to the generator temperature; the engine coolant temperature (ENCT) sensor, which inputs to microprocessor 154 a variable resistor value according to the engine coolant temperature of engine 118; the compressor suction pressure (CSP) transducer, which inputs to microprocessor 154 a variable voltage according to the compressor suction value of compressor 116; the compressor discharge pressure (CDP) transducer, which inputs to microprocessor 154 a variable voltage according to the compressor discharge value of compressor 116; the evaporator outlet pressure (EVOP) transducer which inputs to microprocessor 154 a variable voltage according to the evaporator outlet pressure or evaporator 112; the engine oil pressure switch (ENOPS), which inputs to microprocessor 154 an engine oil pressure value from engine 118; direct current and alternating current sensors (CT1 and CT2, respectively), which input to microprocessor 154 a variable voltage values corresponding to the current drawn by the system 100 and an engine RPM (ENRPM) transducer, which inputs to microprocessor 154 a variable frequency according to the engine RPM of engine 118.

As discussed above, and as shown in FIG. 3, the present invention addresses the use of a controller in a transport refrigeration system to maintain within the operating envelope of compressor 116. The controller 150 of system 100 controls SMV 130 in combination with unloaders (not shown) in compressor 116 and the speed of the engine 118 in order maintain precise control of compressor 116 within its design envelope under any normal operating conditions.

Figure 3:
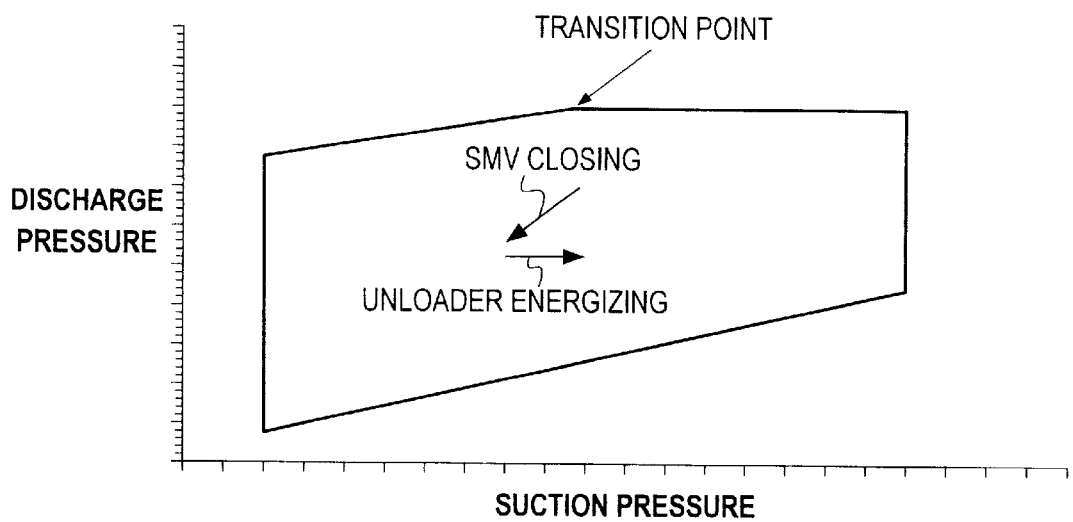
FIG. 3 shows a the effect of control changes implemented in accord with the present invention in relationship to a sample design operating envelope.
Figure 4:
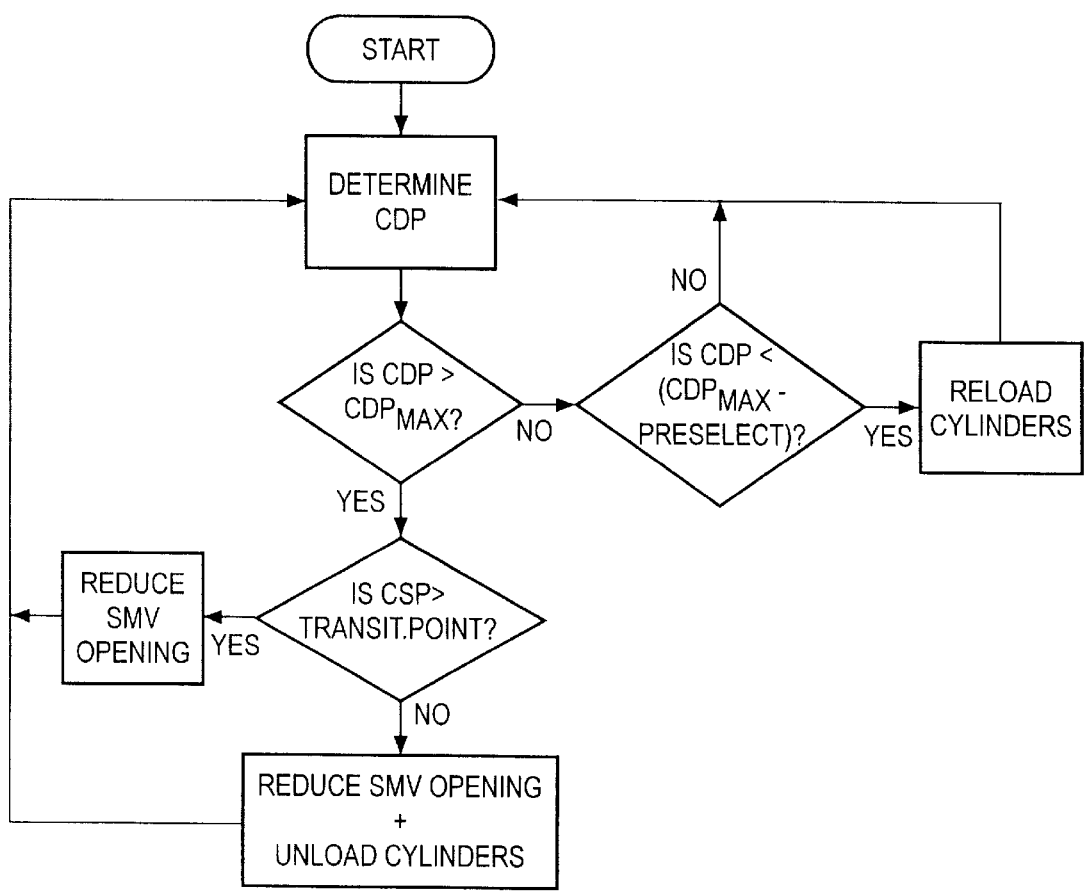
FIG. 4 shows a flow chart of compressor discharge pressure control features of a preferred embodiment of a control process of the present invention.
Figure 5:
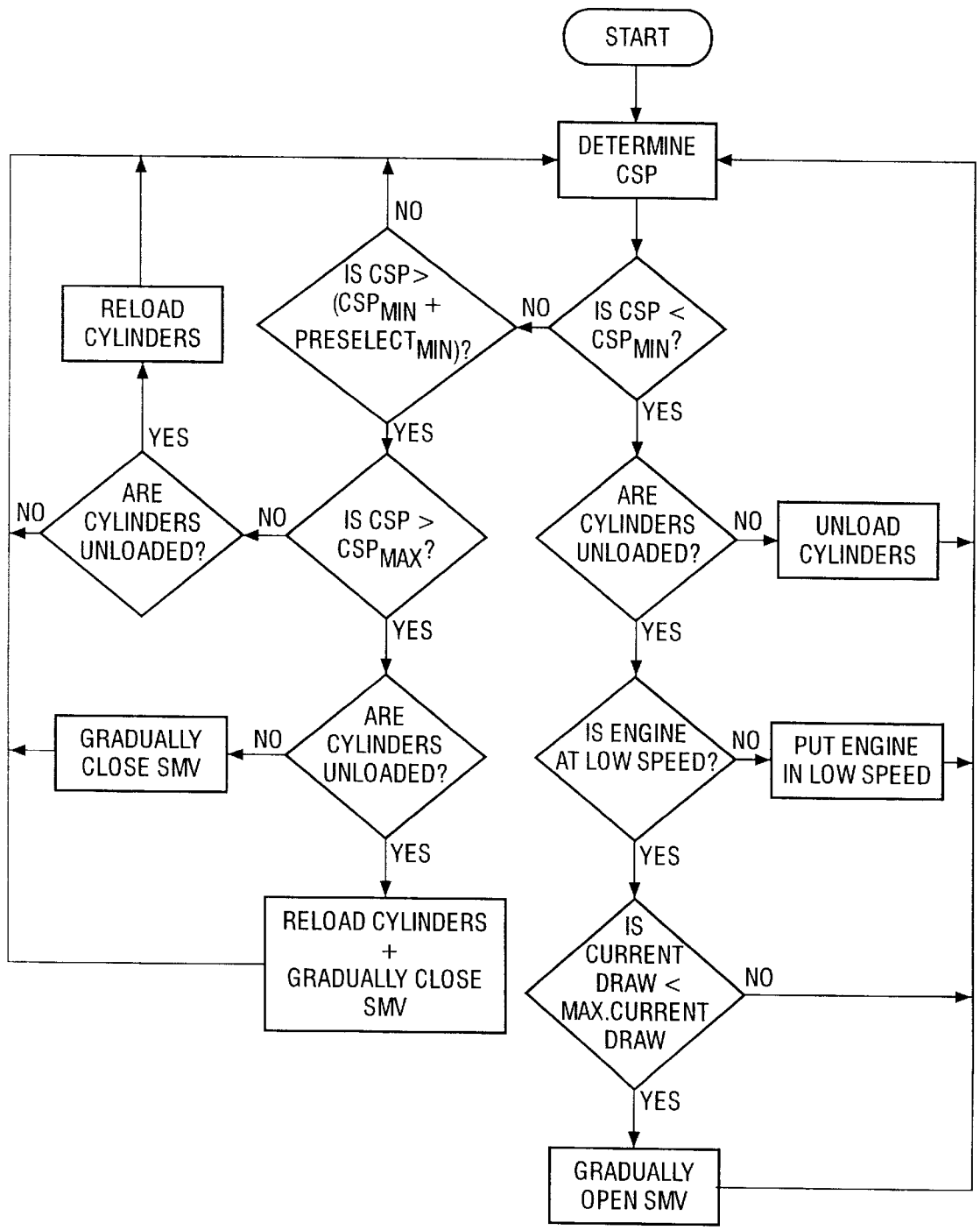
FIG. 5 shows a flow chart of compressor suction pressure control features of a preferred embodiment of a control process of the present invention.

The maximum allowable compressor discharge pressure is calculated by processor 154 of controller 150 as a function of CSP sensor input to controller 150 when the suction pressure is below the transition point, as shown in FIG. 3. Above the transition point, the maximum discharge pressure value is a constant. If the suction pressure is above the transition point, and the discharge pressure is above the maximum allowable (a value that can be preselected in memory 156), controller 150 uses a proportional, integral and derivative ("PID") control loop to gradually close the SMV 130 so as to reduce mass flow of the refrigerant flowing into compressor 116, thereby reducing the CDP values received by controller 150 to below the preselected limit stored in memory 156. If the CSP value received by controller 150 is below the transition point, in addition to the PID control above described, controller 150 actuates the unloaders of the compressor 116. If the CDP is above the maximum allowable discharge pressure value, the compressor rear cylinder bank is unloaded. If, after a predetermined period of time (e.g., 20 seconds) the CDP value is above the maximum allowable discharge pressure, the front cylinder bank is also unloaded.

If the CDP value received by the controller 150 drops more than a predetermined level (e.g., 20 psig) below the maximum allow, then the front cylinder bank of compressor 116 is reloaded. If after 20 seconds the CDP value is still below the limit, the rear cylinder bank of compressor 116 is likewise reloaded. In its most preferred embodiment, neither cylinder bank is reloaded if the CDP value is above a preselected maximum (e.g., 400 psig).

The system and process of the present invention further includes controls for adjusting the suction pressure. If the CSP value input to the controller 150 is below the minimum suction pressure allowed (as preferably programmed into memory 156) for more than a predetermined period of time (e.g., 20 seconds), then the controller 150 sends a control signal to unload the rear cylinder bank of compressor 116. If the CSP value received by controller 150 remains below the minimum suction pressure allowed for a further period of time (e.g., 20 seconds) the front cylinder bank is likewise unloaded. If the CSP value input into controller 150 rises above a predetermined limit (preferably the minimum suction pressure limit described above, plus a hysteresis band), the front cylinder bank is reloaded. If after a further time period (e.g., 20 seconds) the CSP value input into controller 150 remains above the predetermined limit, then the rear cylinder bank is also reloaded.

If, however, the diesel engine embodiment of the present invention, as described above, is in use, and both the front and rear cylinder banks are unloaded, and the CSP value received by controller 150 remains below a preselected minimum suction pressure for a time period (e.g., 20 seconds), then controller 150 issues a control signal to diesel engine 118 forcing it into low speed for a preselected time frame (e.g., 5 minutes). By comparison if both cylinder banks are unloaded, and the engine is in low speed (or if the electrical powered embodiment of the system, as described above, is in use) and the CSP value drops below a preselected minimum value stored in memory 156, the controller 150 uses a proportional-integral ("PI") control to gradually open SMV 130. The PI control utilizes the difference between the CSP value input to controller 150 and a preset target suction pressure stored in memory 156. This PI control is disabled if the current draw value input into controller 150 is equal to or greater than a maximum allowable current draw value stored in memory 156. Also, if the CSP value input to controller 150 is greater than a maximum allowable suction pressure value stored in memory 156, controller 150 issues a control signal to SMV 130, gradually closing it until the CSP value drops below a predetermined limit (preferably the maximum allowable suction pressure minus a hysteresis band) stored in memory.

In both the suction pressure and discharge pressure control processes, the controller 150 preferably places a time delay (e.g., 2 minutes) on the cylinder banks of compressor 116 to avoid excessive cycling.

It will be appreciated by those skilled in the art that various changes, additions, omissions, and modifications can be made to the illustrated embodiments without departing from the spirit of the present invention. For instance, the values stored in memory could be stored in a map, or they could be calculated or stored in an algorithm used by processor 154 of controller 150. Likewise, the advantages of the present invention are equally to non-reciprocating type compressors (e.g. screw compressors). All such modifications and changes are intended to be covered by the following claims.

We claim:

1. A process for improving the operation of a compressor through controlling the compressor discharge pressure, said process comprising the steps of:
   i monitoring the compressor discharge pressure;
   ii comparing said compressor discharge pressure to a predetermined limit stored in a controller memory; and
   iii selectively closing the suction modulation valve in response to a compressor discharge pressure in excess of said predetermined limit; and iv further monitoring the compressor discharge pressure;

v selectively energizing an unloader in response to a discharge pressure above said predetermined limit.

2. A process for improving the operation of a compressor through controlling the ratio of the compressor discharge pressure to the compressor suction pressure, said process comprising the steps of:

i monitoring the compressor discharge pressure;

ii comparing said compressor discharge pressure to a predetermined limit stored in a controller memory;

iii selectively closing the suction modulation valve in response to a compressor discharge pressure in excess of said predetermined limit;

iv further monitoring the compressor discharge pressure;

v monitoring the compressor suction pressure;

vi comparing said suction pressure to a predetermined limit stored in a controller memory vii selectively energizing an unloader in response to a suction pressure below a predetermined limit.

3. A process for improving the operation of a compressor through controlling the ratio of the compressor discharge pressure to the compressor suction pressure, said process comprising the steps of:

i monitoring the compressor discharge pressure;

ii comparing said compressor discharge pressure to a predetermined limit generated by a first algorithm stored in a controller memory;

iii selectively closing the suction modulation valve in response to a compressor discharge pressure in excess of said predetermined limit;

iv further monitoring the discharge pressure;

v further comparing said discharge pressure to a second predetermined limit generated by a second algorithm stored in a controller memory vi selectively energizing an unloader in response to a discharge pressure above said second predetermined limit.

4. A process for improving the operation of a compressor through controlling the minimum compressor suction pressure, said process comprising the steps of:

i monitoring the compressor suction pressure;

ii comparing said compressor suction pressure to a predetermined limit stored in a controller memory;

iii selectively energizing an unloader in response to a suction pressure below said predetermined limit;

iv further monitoring the compressor suction pressure;

v comparing said compressor suction pressure to a second predetermined limit stored in a controller memory; and vi selectively de-energizing an unloader in response to a suction pressure above said second predetermined limit.

5. A process for improving the operation of a compressor for a transport refrigeration unit through controlling the minimum compressor suction pressure, said process comprising the steps of i monitoring the compressor suction pressure;

ii comparing said compressor suction pressure to a predetermined limit stored in a controller memory;

iii selectively energizing an unloader in response to a suction pressure below said predetermined limit;

iv further monitoring the compressor suction pressure;

v further comparing said compressor suction pressure to said predetermined limit stored in a controller memory;

vi selectively limiting the engine speed of said transport refrigeration unit in response to a suction pressure remaining below said predetermined limit.

6. The process of claim 5, comprising the further steps of:

vii further comparing said compressor suction pressure to said predetermined limit stored in a controller memory;

viii selectively opening a suction modulation valve in response to a suction pressure remaining below said predetermined limit.

7. The process of claim 6, wherein said suction modulation valve is selectively opened by a proportional-integral controller, said proportional integral controller selectively operating based upon an algorithm using the difference between the suction pressure being monitored and the predetermined limit.

8. The process of claim 7 comprising the further steps of selectively overriding the proportional-integral controller when the system current draw is greater than the maximum allowable current draw.

9. A process for improving the operation of a compressor through controlling the maximum compressor suction pressure, said process comprising the steps of:

i monitoring the compressor suction pressure;

ii comparing said compressor suction pressure to a predetermined limit stored in a controller memory;

iii selectively closing a suction modulation valve in response to a suction pressure above said predetermined limit;

iv further monitoring the compressor suction pressure;

v comparing said compressor suction pressure to a second predetermined limit stored in a controller memory; and vi selectively opening said suction modulation valve in response to a suction pressure below said second predetermined limit.

* * * * *